United States Patent [19]

Watanabe

[11] Patent Number: 4,676,127
[45] Date of Patent: Jun. 30, 1987

[54] TOOL HOLDING APPARATUS HAVING CUTTING EDGE MOVING FUNCTION

[75] Inventor: Yuuji Watanabe, Chiba, Japan

[73] Assignee: Kuroda Precision Industries, Ltd., Kawasaki, Japan

[21] Appl. No.: 785,553

[22] Filed: Oct. 8, 1985

[30] Foreign Application Priority Data

Oct. 8, 1984 [JP] Japan .............. 59-151232[U]

[51] Int. Cl.⁴ .............. B23B 29/034; B23B 25/06; B23B 25/04
[52] U.S. Cl. .............. 82/1.2; 33/125 R; 324/61 R; 408/13; 408/16; 408/181; 408/241 G; 409/134; 409/210; 409/214; 82/2 B
[58] Field of Search .............. 33/125 R; 82/1.2, 1.4, 82/2 B, 34 R; 408/13, 16, 181, 241 G; 409/134, 210, 214; 324/61 R; 340/870.37; 364/474, 475, 550, 551

[56] References Cited

U.S. PATENT DOCUMENTS

| | | | |
|---|---|---|---|
| 2,590,420 | 3/1952 | Lagher | 408/16 |
| 2,892,526 | 6/1959 | Devaud | 82/2 B |
| 3,237,486 | 3/1966 | Gilbert et al. | 82/1.2 |
| 3,744,352 | 7/1973 | Scholl | 82/1.2 |
| 3,877,329 | 4/1975 | Noa | 82/2 R |
| 4,423,417 | 12/1983 | Tanaka et al. | 324/61 R |
| 4,510,566 | 4/1985 | Gordon | 408/13 |
| 4,552,493 | 11/1985 | Schultshick | 408/13 |

FOREIGN PATENT DOCUMENTS

| | | | |
|---|---|---|---|
| 22569 | 1/1981 | European Pat. Off. | 82/1.2 |
| 4218519 | 9/1942 | Japan . | |
| 106702 | 8/1980 | Japan | 82/1.2 |

Primary Examiner—Nicholas P. Godici
Assistant Examiner—Jerry Kearns
Attorney, Agent, or Firm—Schwartz, Jeffery, Schwaab, Mack, Blumenthal & Evans

[57] ABSTRACT

The invention has as an object to provide a reliable, failure-free tool holding apparatus which allows digitization of a tool holding apparatus having a tool moving function, is free from various problems encountered upon digitization, and does not cause an erroneous operation upon scattering and attachment of chips or cutting oil. In order to achieve this object, a scale member and a moving amount detecting means are arranged to oppose each other. The scale member is arranged at the side of a slide movable in a predetermined direction, and is moved following the movement of the slide. The moving amount detecting means is arranged at the side of the main body and supplies a predetermined number of oscillation pulses to a display in accordance with the moving amount of the scale member. The scale member is enclosed with stretchable members such as bellows members, and is moved in the enclosed, sealed space.

4 Claims, 6 Drawing Figures

TOOL HOLDING APPARATUS HAVING CUTTING EDGE MOVING FUNCTION

BACKGROUND OF THE INVENTION

1. Field of the Invention

The present invention relates to a tool holding apparatus having a cutting edge moving function and, more particularly, to a tool holding apparatus which can detect a moving amount of a cutting edge of a tool mounted on the holding apparatus.

2. Description of the Prior Art

A known tool holding apparatus (so-called boring head) comprising a main body with a shank portion for fixing on a machine spindle, and a tool slide slidable in a direction perpendicular to the main body axis is known. In this boring head, the slide is moved in the direction perpendicular to the main body axis by rotating a feed screw assembled in the main body, and the position of the cutting edge of a tool fixed on the slide is displaced. (Japanese Pat. Publication No. 42-18519, U.S. Pat. Nos. 3,800,637, 3,371,559, 2,771,798 and others).

In such a holding apparatus, the moving amount of the cutting edge of the tool mounted on the slide is determined in accordance with the rotation amount of the feed screw. However, with this cutting edge moving amount detecting method, an error occurring due to a backlash of the feed screw cannot be absorbed. For this reason, in a conventional apparatus of this type, a graduated scale is formed in a side surface of the main body or slide, and the moving amount of the cutting edge is directly read in accordance with the scale.

However, with this detecting means utilizing a calibrated scale, since the minimum scale unit is 1 mm, small displacements cannot be measured. In addition, small chips or cutting oil attaches to the scale, and precise readings may not be obtained.

Since the scale is fixed on the main body or the like, calculation is required to determine a relative displacement of the cutting edge. For this reason, detection is cumbersome and a calculation error tends to occur.

In order to solve these problems, the scale can be digitized. However, since this type of apparatus is mounted on a machine tool, chips or cutting oil tend to attach to the electrodes or circuit portions constituting the digital scale. For this reason, it is difficult to obtain digital measurement signals with high precision without causing an erroneous operation. Thus, a detecting means using a graduated scale as described above must be used despite its drawbacks.

SUMMARY OF THE INVENTION

It is an object of the present invention to provide a tool holding apparatus which is free from the drawbacks of conventional apparatuses, which does not operate erroneously even if chips or cutting oil is scattered and becomes attached thereon, can effectively digitize the scale, and can determine a moving amount of a cutting edge at high speed and precision.

It is another object of the present invention to provide a tool holding apparatus which can directly display a displacement of a tool slide relative to a given position, and which allows reliable and correct readings of measurements by digital display.

It is still another object of the present invention to provide a tool holding apparatus in which an electrical contact portion of a scale is sealed and easily slides so that chips or the like may not become attached to the electrical contact portion.

It is still another object of the present invention to provide a tool holding apparatus which can completely remove errors such as backlash by a feed screw.

In order to achieve the above objects of the present invention, there is provided, as shown in FIGS. 1 to 5, a tool holding apparatus having a main body 1 with a shank portion 10 for fixing on a machine spindle, and a tool slide 2 movable in a predetermined direction relative to the main body 1, comprising a scale member 32 arranged at the side of the slide 2 and moving following movement of the slide 2, and a moving amount detecting means 33, arranged at the side of the main body 1 to oppose the scale member 32, for supplying a predetermined number of pulses to a digital display 34 in accordance with a moving amount of the scale member 32, the scale member 32 being moved in a sealed space.

In order to allow the scale member 32 to smoothly move in the sealed space, it is preferable that a recess 36 opposing the detecting means 33 in a moving direction of the slide 2 be formed in frames for storing and fixing the moving amount detecting means 33, the scale member 32 held in a hollow space between the two ends of the slide 2 through arm members 35 be movably inserted in the recess, and stretchable members 45 such as bellows members enclose and seal between the frames 30 and 31 and the arm members 35.

In this case, it is preferable that a negative electrode of the scale member 32 comprise a photoetched scale plate, the moving amount detecting means 33 comprise a detection positive electrode for reading a change in capacitance upon movement of the scale member 32, and the stretchable members 45 comprise bellows members.

According to the present invention, the scale member 32 is not mounted on a feed screw 13 or the like so as to indirectly detect the moving amount of the slide 2, but the scale member 32 is mounted at the side of the slide 2 so as to move following the movement of the slide 2. Correct and fast measurement can therefore be performed without an error such as a backlash.

Since the moving amount detecting means 33 for supplying a predetermined number of pulses to the display 34 in correspondence with a moving amount of the scale member 32 is arranged at the side of the main body 1, various circuits and other electrical components are concentrated. Since the concentrated electrical components are sealed in the frames 30 and 31, cutting oil or the like does not ingress into the electrical components and does not cause an erroneous operation thereof.

Since the scale member 32 moves in a sealed space, chips or the like will not become attached to the scale member 32. Therefore, an erroneous operation of the electrical components is prevented, and smooth operation thereof is guaranteed.

According to the present invention, the scale member 32 at the side of the tool 2 is opposed to the moving amount detecting means 33 such as a detection positive plate electrode or the like arranged at the side of the main body 1 and supplying an oscillation pulse to the digital display 34 in correspondence with the moving amount of the scale member 32. The moving amount of the scale member 32 is directly detected while both the members 32 and 33 slide relative to each other. Thus, when the digital display 34 is reset to zero at a given position, a relative displacement from the given position can be directly displayed. In addition, digital display allows reliable and easy reading.

According to the present invention, the scale member 32 is supported in a hollow space. The scale member 32 can therefore be easily moved following the movement of the slide 2, and can easily abut against the moving amount detecting means 33, thereby allowing smooth measurement. In addition, since the scale member 32 is supported in a hollow space, it can be easily enclosed by stretchable members 45 such as bellows members, and attachment of chips or the like on the scale member 32 can be prevented.

In the present invention, the moving amount of the slide 2 is not indirectly measured utilizing rotation of the feed screw 13, but the relative displacement between the opposing scale member 32 and moving amount detecting means 33 is directly measured. Therefore, an error such as a backlash caused by the feed screw 13 is eliminated, and correct measurement can be performed.

According to the present invention, the digital display 34 and the moving amount detecting means 33 can be separate members, and remote control can be performed.

When a stepping motor is coupled to the feed screw 13 for moving the slide 2, the stepping motor can be rotated a predetermined number of times utilizing the oscillation pulses of the moving amount detecting means 33. Consequently, NC control or the like of a machine tool mounting the tool holding apparatus can be achieved.

The present invention allows, for the first time, digitization of a tool holding apparatus having a cutting edge moving function, and at the same time can completely solve various problems encountered in such digitization. Thus, a tool holding apparatus of the present invention is stable and does not fail even if chips or cutting coil is scattered and becomes attached thereto. Moreover, the moving amount of the cutting edge can be measured at high speed and precision without causing an error by the feed screw or the like.

BRIEF DESCRIPTION OF THE DRAWINGS

FIGS. 1 to 5 respectively show an embodiment of the present invention, in which
FIG. 1 is a front view,
FIG. 2 is a side view,
FIG. 3 is a sectional view along the line A—A' in FIG. 2,
FIG. 4 is an enlarged view of the main part showing the structure of a scale main body,
and
FIG. 5 is a sectional view along the line B—B' in FIG. 4.

DETAILED DESCRIPTION OF THE PREFERRED EMBODIMENT

Figure 1:
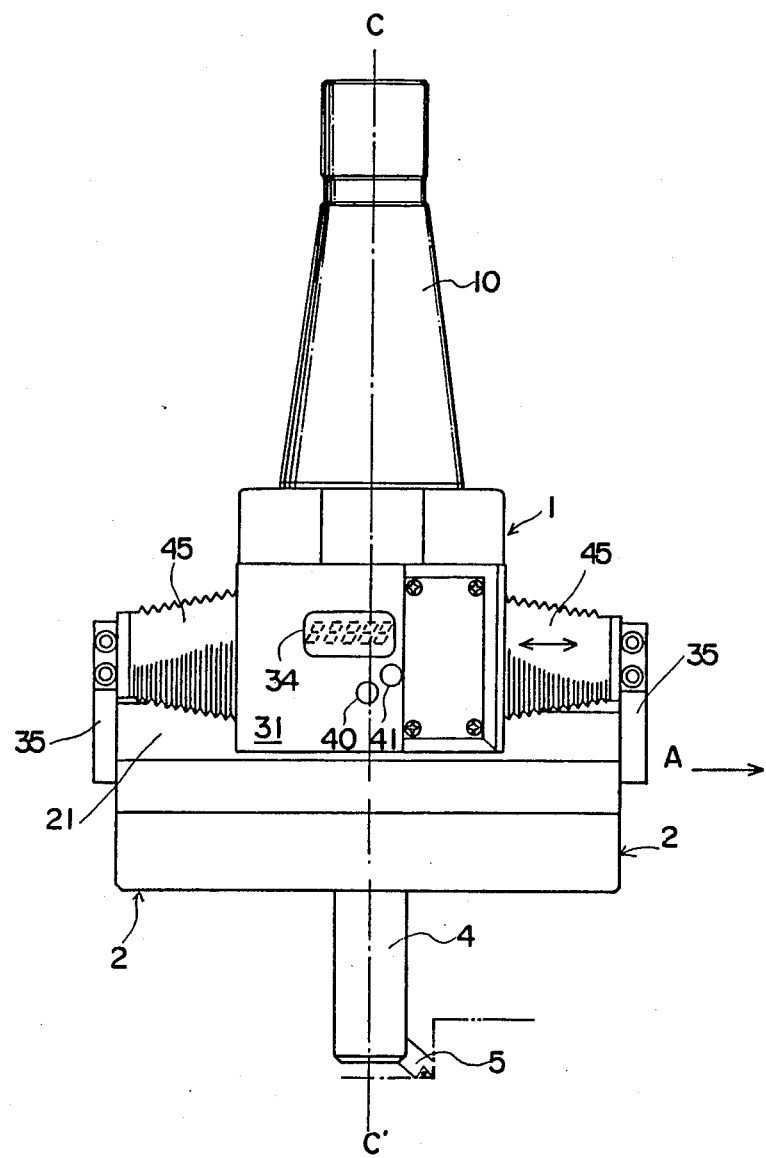
Figure 2:
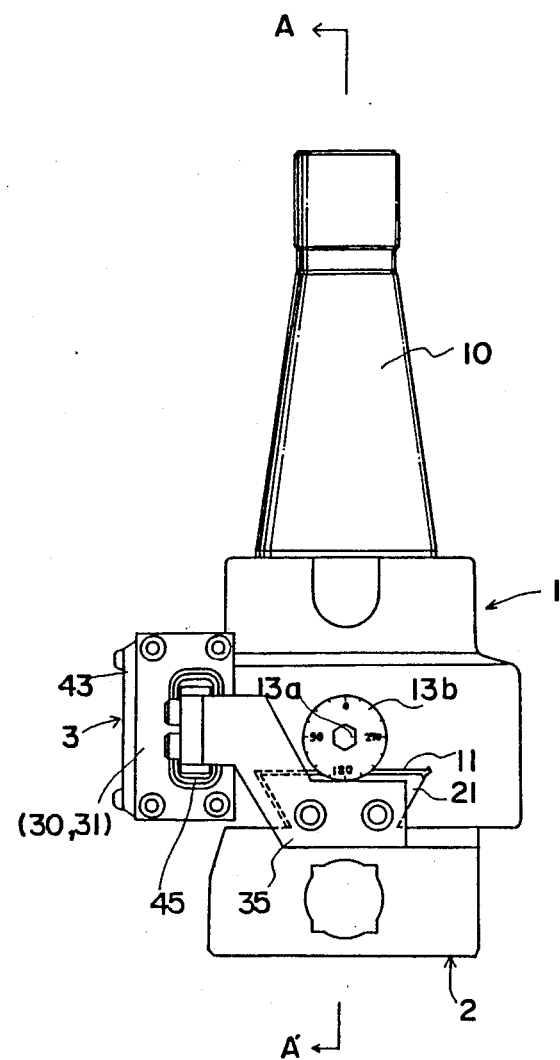
Figure 3:
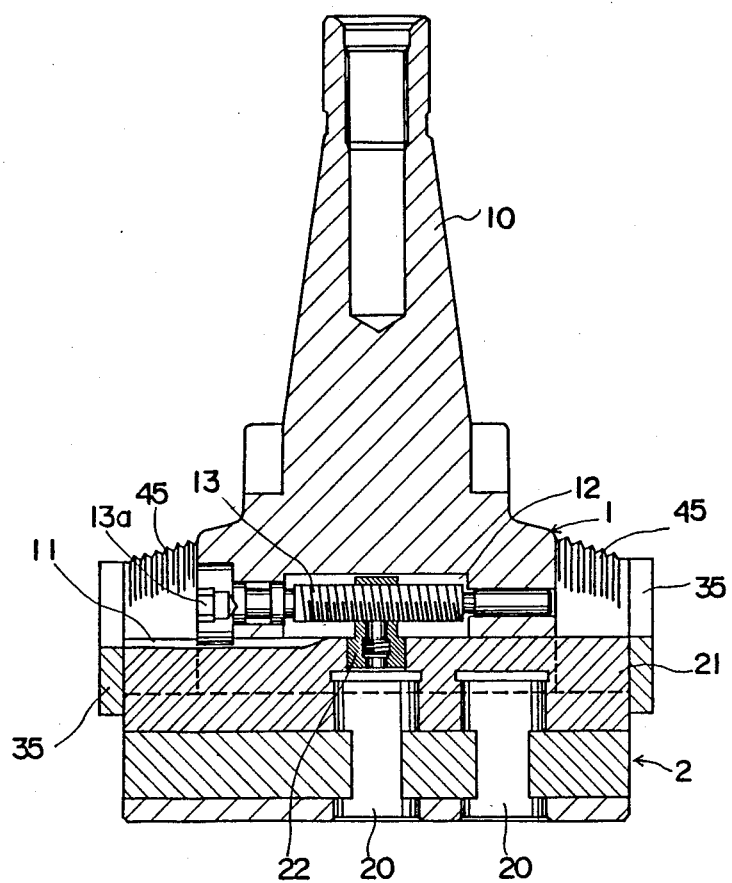
Figure 4:
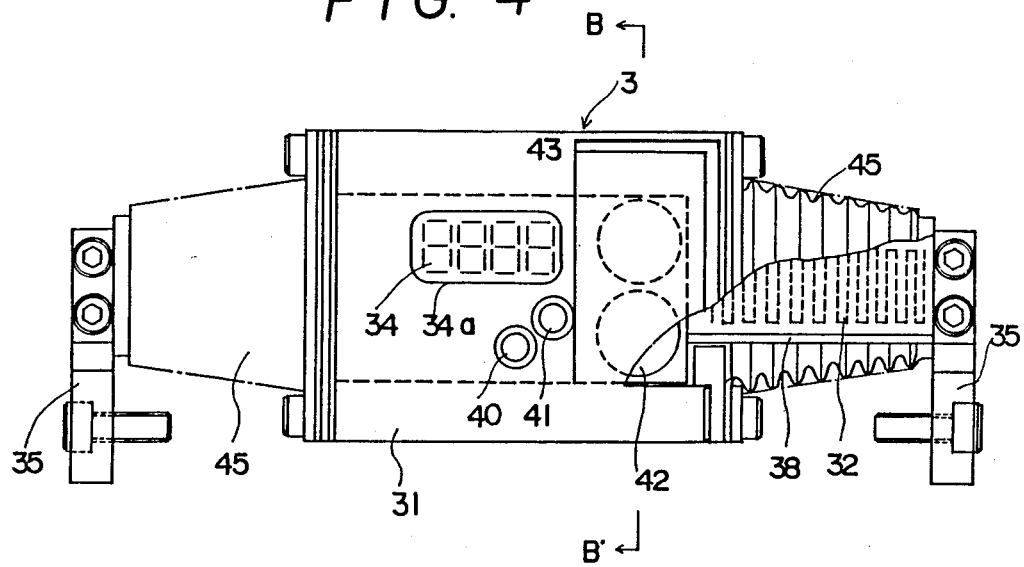
Figure 5:
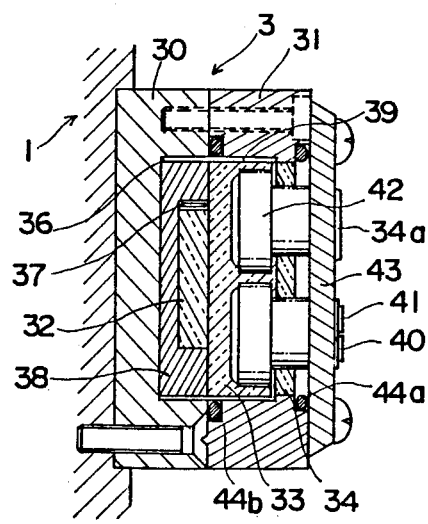

The preferred embodiment of the present invention will be described in detail with reference to the accompanying drawings. The sizes, materials, shapes and arrangements of the respective parts described in the embodiment are not indented to limit the scope of the present invention and provide only illustrative examples, unless otherwise stated.

FIGS. 1 to 5 show a tool holding apparatus having a cutting edge moving function according to an embodiment of the present invention.

The apparatus comprises a main body 1 with a shank portion 10 fixed on the machine spindle, a slide 2 arranged below the main body 1 so as to be slidable in a direction (to be referred to as a moving direction A) perpendicular to an axis C—C' and having a plurality of tool mounting holes 20, and a digital meter 3 of capacitance conversion type arranged at the front surface side of the main body 1.

The details of the respective components will be described below. The main body 1 has on its lower surface an inversely tapered slide groove 11 which extends along the moving direction A. A rectangular recess 12 is formed at the center on the groove 11. A rotatable feed screw 13 is inserted into the recess 12 from the main body 1 side along the moving direction A. A hexagonal hole 13a is formed on the head of the feed screw 13. Thus, the feed screw 13 can be rotated by a hexagonal nut or the like. An angle scale 13b for determining the feed amount of the feed screw 13 is graduated around the hexagonal hole 13a.

The slide 2 has an inversely tapered slide portion 21 which extends along the moving direction A and corresponds to the groove 11. A feed nut 22 is fixed at the center of the upper end face of the slide portion 21. The slide portion 21 is fitted in the groove 11 of the main body 1, and the feed nut 22 is fitted around the feed screw 13. Thus, when the feed screw 13 is rotated, the slide 2 can be reciprocated along the moving direction A.

The digital meter 3 has a pair of separable frames 30 and 31 which are fixed on the front surface of the main body 1. Inside the frames 30 and 31, a scale plate 32 obtained by photoetching a negative electrode, a detection positive electrode 33 abutting against the scale plate 32, and a liquid crystal display 34 for counting the number of pulses oscillated by the detection positive electrode 33 upon relative displacement between the members 32 and 33 and performing digital display in correspondence with the obtained pulse count are arranged at predetermined positions.

In the rear frame 30 directly fixed to the front surface of the main body 1, a rectangular recess 36 is formed to extend along the moving direction A and oppose the frame 31. A flat scale plate holder 38 for fixing the scale plate 32 through a spring 37 is slidably arranged in the recess 36.

The scale plate 32 is held in a hollow space between a pair of arm members 35 which extend from the two side edges of the slide 2 toward the front surface of the main body 1. The scale member 32 is movable within the recess 36 following the movement of the slide 2.

Meanwhile, in the frame 31, a desired space 39 is formed at a position corresponding to the recess 36 at the opposite side of the rear frame 30. The detection positive electrode 33 and the liquid crystal display 34 electrically connected thereto are housed and fixed in the space 39. A window 34a of the liquid crystal display 34 is formed in the front surface of the frame 31, and a power source button 40 and a reset button 41 are arranged on the lower surface of the frame 31.

A mercury battery or other battery 42 is housed in the space at the side of the detection positive electrode 33. The battery 42 is fixed at a predetermined position by a cover 43, and is electrically connected to the detection positive electrode 33 and other components.

O-rings 44a are mounted between the rear frame 30, the front frame 31 and the cover 43 so as to prevent ingress of cutting oil and to prevent an electrical failure of various members. Bellows members 45 are mounted between the arm members 35 and the frames 30 and 31 so as to enclose the scale plate holder 38. The bellows members 45 prevent attachment of cutting oil or chips on the surface of the scale plate 32.

In this embodiment, after the reset button 41 is depressed to reset the liquid crystal display 34 at zero and the slide 2 is moved by rotation of the feed screw 13, the scale plate 32 fixed to the slide 2 is moved accordingly.

The scale plate 32 and the detection positive electrode 33 slide relative to each other while they abut against each other in the frames 30 and 31. A predetermined number of pulses corresponding to the moving amount from the reset position are oscillated, and the liquid crystal display 34 provides a digital display corresponding to the number of oscillated pulses.

In this apparatus, a relative displacement of the slide 2 from a given position can be directly displayed at any time, and digital display allows reliable and correct reading of the measurements.

Since the scale plate 32 which moves following movement of the slide 2 is held in a hollow space, it can be easily fitted inside the frames 30 and 31 of the meter 3 fixed to the main body 1, and can easily abut against the detection electrode 33, thereby allowing smooth measurement. Since the scale member 32 is held in a hollow space, it can be easily enclosed by stretchable members such as bellows members 45, and attachment of chips or the like on the scale plate 21 can be prevented.

In this embodiment, the moving amount of the slide 2 is not indirectly measured utilizing rotation of the feed screw 13, but the moving amount is directly converted into an electrical signal for measurement. Therefore, an error due to backlash of the feed screw 13 or the like can be rendered negligible, and reliable measurement can be performed.

The liquid crystal display 34 and the detection electrode 33 can be separate members. A stepping motor for driving the feed screw 13 can be added and can be driven a desired number of times utilizing the oscillation pulses from the detection electrode 33. As a result, NC control or the like of a tool machine mounting the tool holding apparatus can be achieved.

If only digital display is to be achieved, the moving amount of the slide 2 can be digitally displayed utilizing a rotational amount of the feed screw used for moving the slide 2.

Figure 6:
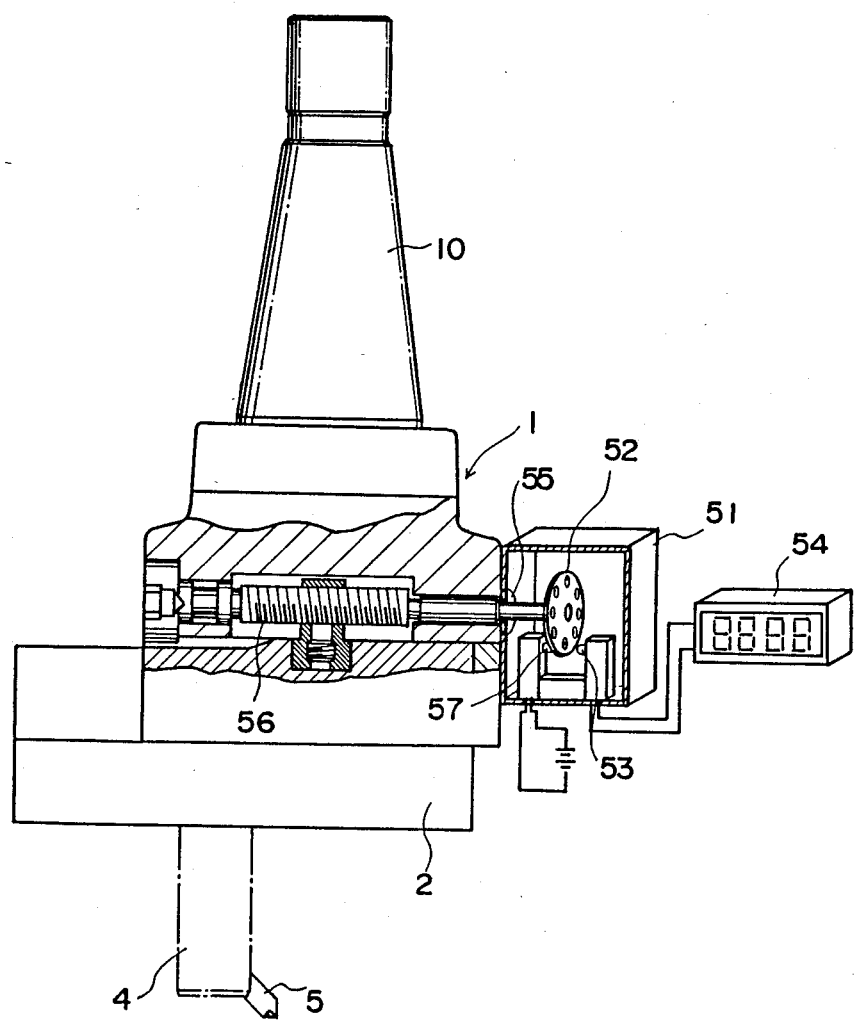
FIG. 6 is a sectional view of a main part of an example for explaining a difference from the embodiment of the present invention.

An arrangement for this purpose will be described briefly with reference to FIG. 6. A disk plate 52 with a plurality of small holes at an outer periphery, and a light-emitting element 57 and a light-receiving element 53 sandwiching the disk 52 are arranged in a sealed housing 51. A number of pulses corresponding to the amount (number) of light received by the element 53 are generated. The rotating shaft of the disk 52 and one end of a feed screw 56 are coupled through an oil seal 55. The light-receiving element 53 and a liquid crystal display 54 are connected.

As a result, an amount of light corresponding to the rotational amount of the feed screw 56 is received by the light-receiving element 53. A moving amount corresponding to the number of generated pulses is digitally displayed on the liquid crystal display 54 connected to the element 53.

In accordance with this technique, since the measuring portion is completely sealed in a housing, an electrical operation error due to chips or cutting oil can be prevented. However, an error due to backlash of the feed screw 56 or the like cannot be absorbed, and reliability is slightly degraded.

What is claimed is:

1. A tool holding apparatus having a main body with a shank portion for fixing on a machine spindle, and a tool slide movable in a predetermined direction relative to said main body, comprising a scale member held in a hollow space between two ends of said tool slide through a pair of arm members extending from a side of said main body and moving following movement of said tool slide, a moving amount detecting means stored and fixed in frames at the side of said main body to oppose said scale member, and a digital display for performing digital display in accordance with a moving amount of said scale member based on a predetermined number of pulses oscillated by said moving amount detecting means, wherein a recess extending in a moving direction of said tool slide is formed in said frames for storing and fixing said moving amount detecting means, said scale member held in the hollow space between said pair of arm members is movably inserted in said recess, and stretchable members enclose and seal between said frames and said arm members.

2. An apparatus according to claim 1, wherein a negative electrode of said scale member comprises a photo-etched scale plate, and said moving amount detecting means comprises a detection positive electrode for reading a change in capacitance upon movement of said scale plate.

3. An apparatus according to claim 2, wherein said stretchable members comprise bellows members.

4. An apparatus according to claim 1, wherein said stretchable members comprise bellows members.

* * * * *